US008838703B2

(12) United States Patent
Yue et al.

(10) Patent No.: US 8,838,703 B2
(45) Date of Patent: Sep. 16, 2014

(54) METHOD AND SYSTEM FOR MESSAGE PROCESSING

(75) Inventors: Xuqiang Yue, Hangzhou (CN); Lin Wang, Hangzhou (CN); Zhenwei Yao, Hangzhou (CN); Zuohong Liu, Hangzhou (CN); Xianjie Zeng, Hangzhou (CN)

(73) Assignee: Alibaba Group Holding Limited (KY)

( * ) Notice: Subject to any disclaimer, the term of this patent is extended or adjusted under 35 U.S.C. 154(b) by 99 days.

(21) Appl. No.: 12/456,223

(22) Filed: Jun. 12, 2009

(65) Prior Publication Data

US 2010/0057867 A1 Mar. 4, 2010

(30) Foreign Application Priority Data

Sep. 2, 2008 (CN) .......................... 2008 1 0214332

(51) Int. Cl.
  G06F 15/16 (2006.01)
  H04W 4/00 (2009.01)
  H04M 1/64 (2006.01)
  H04L 29/08 (2006.01)
(52) U.S. Cl.
  CPC ..................................... H04L 67/26 (2013.01)
  USPC .......................... 709/206; 455/466; 379/67.1
(58) Field of Classification Search
  USPC .......................................................... 709/206
  See application file for complete search history.

(56) References Cited

U.S. PATENT DOCUMENTS

| | | | |
|---|---|---|---|
| 6,154,781 A | 11/2000 | Bolam et al. | |
| 6,175,743 B1 * | 1/2001 | Alperovich et al. | 455/466 |
| 6,182,143 B1 | 1/2001 | Hastings et al. | |
| 6,202,093 B1 | 3/2001 | Bolam et al. | |
| 6,205,205 B1 * | 3/2001 | Goldberg et al. | 379/67.1 |
| 6,298,455 B1 | 10/2001 | Knapman et al. | |
| 6,334,151 B1 | 12/2001 | Bolam et al. | |
| 6,442,250 B1 * | 8/2002 | Troen-Krasnow et al. | 379/93.15 |
| 6,643,682 B1 | 11/2003 | Todd et al. | |
| 6,772,216 B1 | 8/2004 | Ankireddipally et al. | |
| 6,877,107 B2 | 4/2005 | Giotta et al. | |
| 7,020,697 B1 | 3/2006 | Goodman et al. | |
| 7,054,629 B2 * | 5/2006 | Turina et al. | 455/432.1 |
| 2003/0018773 A1 * | 1/2003 | Beckmann et al. | 709/223 |
| 2003/0070080 A1 * | 4/2003 | Rosen | 713/187 |
| 2004/0133646 A1 * | 7/2004 | Leukert-Knapp et al. | 709/206 |
| 2005/0038853 A1 * | 2/2005 | Blanc et al. | 709/206 |
| 2005/0256931 A1 | 11/2005 | Follmeg et al. | |

(Continued)

FOREIGN PATENT DOCUMENTS

| | | |
|---|---|---|
| JP | 2005521950 | 7/2005 |
| JP | 2007287148 | 11/2007 |
| WO | 03083703 | 10/2003 |

*Primary Examiner* — Brian P Whipple
*Assistant Examiner* — James Edwards
(74) *Attorney, Agent, or Firm* — Van Pelt, Yi & James LLP

(57) ABSTRACT

Processing a message includes receiving at a message processing system the message that is distributed by a message distributor, the message having a message type, based at least in part on the message type, locating among a plurality of subscriber groups a subscriber group that subscribes to the message type, each of the plurality of subscriber groups having a unique identifier and comprising one or more message subscriber nodes, at least some of the one or more message subscriber nodes in each of the plurality of subscriber groups being connected to the message processing system, and transmitting the message to a message subscriber node that belongs to the subscriber group that is located.

15 Claims, 4 Drawing Sheets

(56) References Cited

U.S. PATENT DOCUMENTS

| | | | |
|---|---|---|---|
| 2005/0262205 A1* | 11/2005 | Nikolov et al. | 709/206 |
| 2005/0289344 A1* | 12/2005 | Slick et al. | 713/170 |
| 2006/0106840 A1 | 5/2006 | Rooney | |
| 2006/0146999 A1 | 7/2006 | Thompson et al. | |
| 2007/0218924 A1* | 9/2007 | Burman et al. | 455/466 |
| 2007/0245018 A1 | 10/2007 | Bhola et al. | |
| 2009/0144385 A1* | 6/2009 | Gold | 709/206 |
| 2009/0285161 A1* | 11/2009 | Howe | 370/328 |
| 2009/0327442 A1* | 12/2009 | Rosenfelt et al. | 709/206 |
| 2012/0016858 A1* | 1/2012 | Rathod | 707/706 |
| 2014/0025551 A1* | 1/2014 | Miles et al. | 705/37 |

* cited by examiner

METHOD AND SYSTEM FOR MESSAGE PROCESSING

CROSS REFERENCE TO OTHER APPLICATIONS

This application claims priority to People's Republic of China Patent Application No. 200810214332.4 entitled MESSAGE PROCESSING METHOD AND SYSTEM filed Sep. 2, 2008 which is incorporated herein by reference for all purposes.

BACKGROUND OF THE INVENTION

Some existing web services systems use a publish-subscribe model for handling events in a system. A typical system includes a message distributor, message subscribers and a middleware.

Data of messages are transmitted between the message distributor and the message subscribers via the middleware. The message distributor may distribute various types of messages relating to a variety of topics. The message subscribers may subscribe for the messages of interest. The middleware may transmit the messages of a topic distributed by the message distributor to the message subscribers that have subscribed for a particular message topic. Messages of the same topic may be subscribed by multiple different message subscribers. Different message subscribers may process the received messages differently. For example, two message subscribers, Subscriber A and Subscriber B, subscribe to the same topic, e.g. Topic A, each of the two message subscribers may process the received messages of Topic A in its own manner.

For example, during an electronic transaction, when the transaction is created successfully, a message distributor such as a transaction handling system may send a notification message notifying the success of the transaction. A message subscriber such as a transaction log server may subscribe for the notification message so as to record transaction logs, and another message subscriber such as a seller notification server may also subscribe for the notification message so as to notify the seller that a product has been sold. That is, the two servers may process the same message differently.

In some application scenarios, more than one subscriber in the service systems may subscribe for messages of the same topic. In such cases, a middleware is used to transmit the messages of the same topic to the more than one subscriber. In a typical system, each message subscriber is formed by a single node, which means that only one device can be used to provide services. As the amount of data to be processed increases, such typical systems often no longer meet the requirements of the large amount of data for several reasons.

First, when a message subscriber node fails, the message subscriber may be unable to receive the subscribed messages from the middleware or may be unable to process the subscribed messages even if the messages are received. In such cases, message processing of the message subscriber is interrupted, thereby adversely affecting the processing of other systems associated with the message subscriber.

Second, a single node may be incapable of processing large message traffic. Therefore, when the amount of messages is too large for a single node, hardware upgrade may be needed to accommodate a large amount of data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
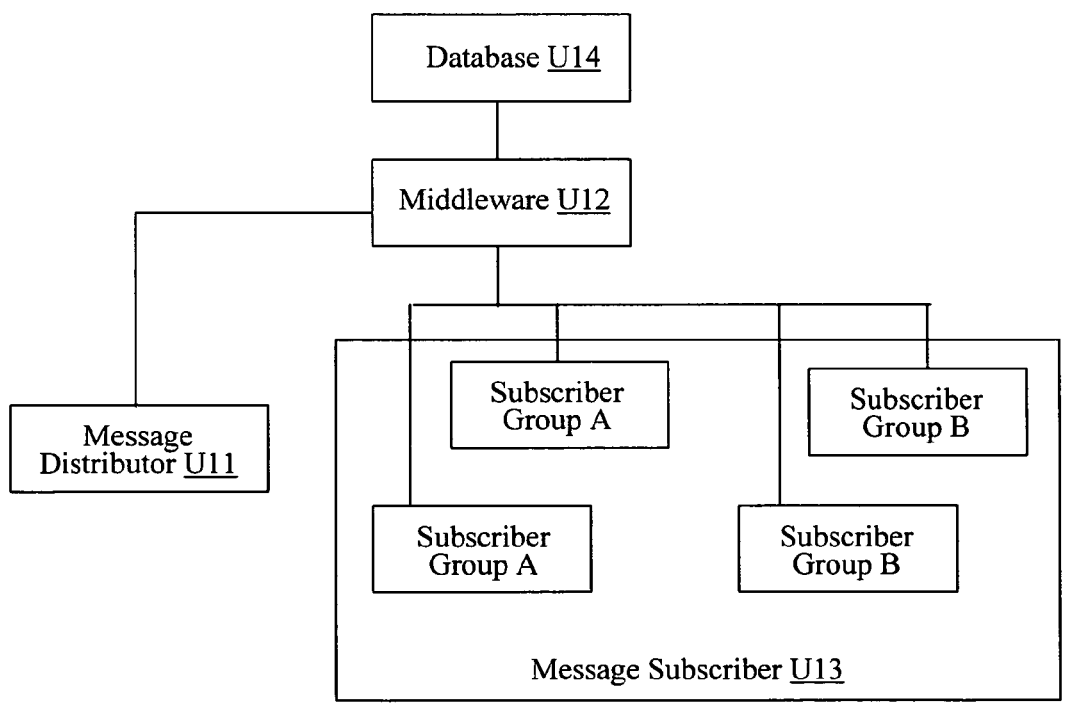
FIG. 1 is a block diagram illustrating an embodiment of a message processing system.

FIG. 1 is a block diagram illustrating an embodiment of a message processing system. As shown in FIG. 1, the message processing system includes a message distributor U11, a middleware U12 and a number of message subscribers U13. In some embodiments, the message distributor, the middleware, and the message subscribers are implemented using devices such as servers with appropriate software. The devices are connected on a wired, wireless, or mixed network such as a local area network (LAN) or a wide area network (WAN). In this example, the message distributor U11 and the message subscribers U13 are connected to a server implementing the middleware U12. Messages generated by the message distributor (for example, messages generated by transaction servers that process user transactions) are sent to the middleware, which re-transmits the message to appropriate subscriber(s).

In this example, message subscribers U13 are divided into groups, e.g. subscriber groups A, B, etc., as shown in FIG. 1, according to the functions of the subscribers. For example, several log servers that record transaction information are grouped as subscriber group A, and several seller notification servers are grouped as subscriber group B. Each group is assigned a unique group identifier (group ID) which is used to uniquely identify the group. Each group of subscribers may include one or more nodes. The nodes in the same group share the same group ID. Whenever a connection is made between a subscriber node and the middleware, information about the connection is added to a list. In some embodiments, the information includes a connection ID and the group ID of the subscriber node. In some embodiments, the information includes the IDs and/or addresses of the subscriber node and the middleware server.

The message distributor U11 is configured to distribute messages onto a server of the middleware U12. The middleware U12 searches, according to the message type of the received message, for the group ID(s) corresponding to the message type. If any group ID that corresponds to the message type is located, the middleware U12 may select a node among the nodes of the group having the searched group ID, and push the message to the selected node. Since the messages of the same topic may be subscribed by several different groups of subscribers, a message may be transmitted to several groups of subscribers, and only be received by one node in each of the groups.

A subscriber node in the subscriber group is configured to process received messages. The nodes in the same group of subscribers may process the same message in the same way, while the nodes in different groups may process the received message differently. In a given group, one message is processed by only one node within the group. For example, during an electronic transaction, each device/node in a subscriber group comprising transaction log servers is configured to use a message announcing the success of transaction to record transaction logs, and each device/node in a subscriber group comprising seller notification servers may use the same message to notify the seller that some product is sold.

In some embodiments, the message processing system further includes a database U14. In this example, database U14 is connected to middleware U12 and is adapted to store the message received by the middleware, the corresponding relationships between each message type and identification of each subscriber group, and of the corresponding relationships of nodes and their respective group identifiers and subscriber group. In some embodiments, the information is stored in the internal storage structure within the server of the middleware U12. Other appropriate arrangements can be used in different embodiments.

As described above, in the system a plurality of nodes are configured in each group of message subscribers to share the work load of a message distributor. Therefore, the system thus configured has a good fault-tolerant ability and is capable of processing large amounts of message traffic.

When one node in a subscriber group fails, the other nodes in the same subscriber group continue to process the received message(s). In this way, messages are processed without interruption, giving the overall system good fault-tolerance.

In some embodiments, when a large amount of traffic is received, one or more new nodes may be added to a subscriber group to share the processing load. For example, suppose a subscriber group has 5 nodes and the messages of a certain topic may be generated at a rate of 500 per seconds, all of the 5 nodes may be used to process the 500 messages, and in this case, each node may process 100 messages per second. Even if one of the 5 nodes fails, there remain the other 4 nodes which are capable of processing the 500 messages. In this way, the message processing of the whole system will not be interrupted despite the failure of one node.

In some embodiments, the subscriber nodes obtain the addresses and ports information of the available middleware servers. Each node of a subscriber group may be connected to a server of the middleware in a long connection mode. For example, if the employed communication protocol is the Transmission Control Protocol (TCP), the long connection is TCP long connection. As used herein, a "long connection" is distinguished from a "short connection". In the short connection mode, the connection established between two devices is disconnected as soon as processing is finished. In the long connection mode, a list of connections is maintained, which includes information about the identifier of each group and its respective long connection information (such as the name and/or address of each subscriber node within the group and the name/address the respective middleware server in a long connection). The established connection is maintained after the processing is finished. With the long connection, when there is a message to be transmitted, the server of the middleware may search for the connection(s) to the node(s) of the subscriber group(s) that has subscribed the message among the current connections established to the middleware, and push the message to the node(s) of subscriber(s). The long connection has good real-time performance by avoiding the repeated establishment and disconnection of the connections. The messages can be transmitted quickly in the long connection mode. In the event that the server is restarted or there is any network connection problem, the subscriber node will attempt to reestablish the TCP long connection.

In a system such as the one shown in FIG. 1, the number of nodes in each subscriber group may be adjusted dynamically. That is, one or more nodes may be added into or deleted from a subscriber group as required. When the message traffic becomes heavier and the nodes in a subscriber group are not sufficient to process the messages, one or more new nodes may be added. To add new nodes, the group ID of this subscriber group is used to associate the new nodes with the server of the middleware. If too many nodes are included in a subscriber group, nodes may be removed from the group by stopping the nodes to be removed from processing messages.

Figure 2:
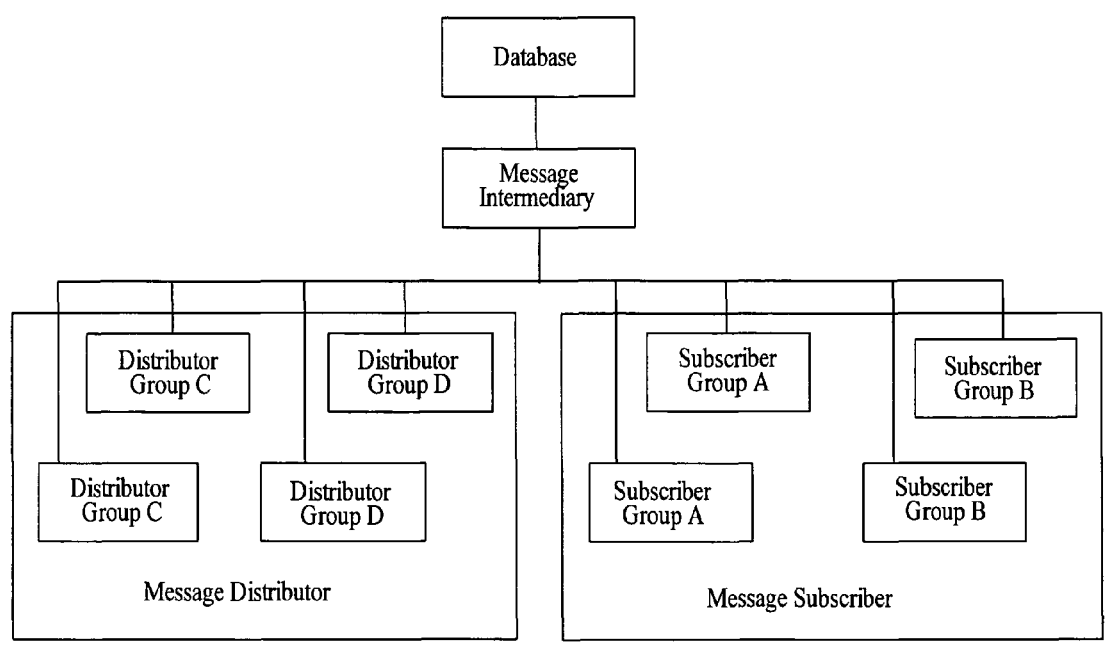
FIG. 2 is a block diagram illustrating another embodiment of a message processing system.

In some embodiments, there are multiple message distributors to provide better redundancy. The message distributors may also be divided into groups. Each distributor group may be assigned a unique group ID and may include one or more nodes. The node in the same group shares the same group ID. Each node is connected to a middleware server and the connection is identified using the group ID. When a message is ready to be distributed, a message distributor node within its group is selected to transmit the message. In embodiments where multiple message distributor nodes are available, a node may be selected at random, or a least busy node is selected for message transmission. In this way, the distribution of the message is uninterrupted when a node in the distributor group fails. In addition, when the message traffic to be distributed is heavy, a plurality of nodes in the group may be used, so as to share the processing load of the distributor. FIG. 2 is a block diagram illustrating another embodiment of a message processing system. In this example, the message subscribers are divided into a group A and a group B, each of which includes 2 nodes; the message distributors are divided into a group C and a group D, each of which also includes 2 nodes. Different arrangements of groups and nodes can be used in other embodiments.

In some embodiments, the message processing system implements a subscription procedure and a message processing procedure. Examples of the two procedures are described below.

Figure 3:
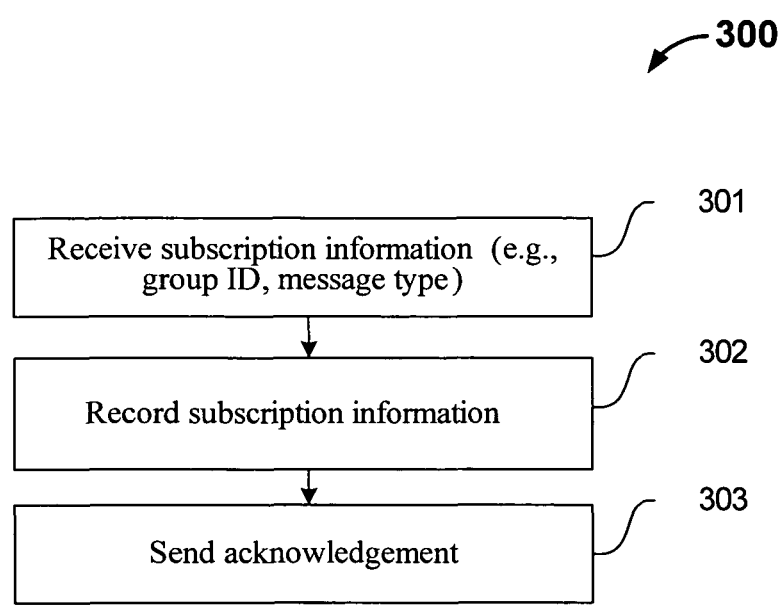
FIG. 3 is a flow chart illustrating a message subscription procedure of a subscriber according to an embodiment of a message processing system.

FIG. 3 is a flow chart illustrating a message subscription procedure of a subscriber according to an embodiment of a message processing system.

Process 300 may be implemented, for example, on a middleware such as U12 of FIG. 1. At 301, subscription information is received from a message subscriber, indicating that the message subscriber is subscribing to a certain topic of interest. The message subscriber may subscribe on behalf of a subscriber group. The subscription information includes the group ID as well as the message type to be subscribed by the subscriber group.

at 302, subscription information such as the mapping of the group ID and the message type subscribed by the message subscriber is recorded. The recorded information is stored, for example in a memory/storage on the middleware or in a database accessible by the middleware.

At 303, an acknowledgement message indicating the success of the subscription to the message subscriber is sent. In the event that the reception or recordation of the subscription information fails, a negative acknowledgement is sent so that the message subscriber may resend the subscription information. Process 300 may be repeated for the message subscriber to subscribe to multiple message types.

After the message subscriber subscribes to messages according to the above procedure, the middleware may push messages to the message subscriber, particularly, may push the messages to a node selected within the subscriber group of the message subscriber.

Figure 4:
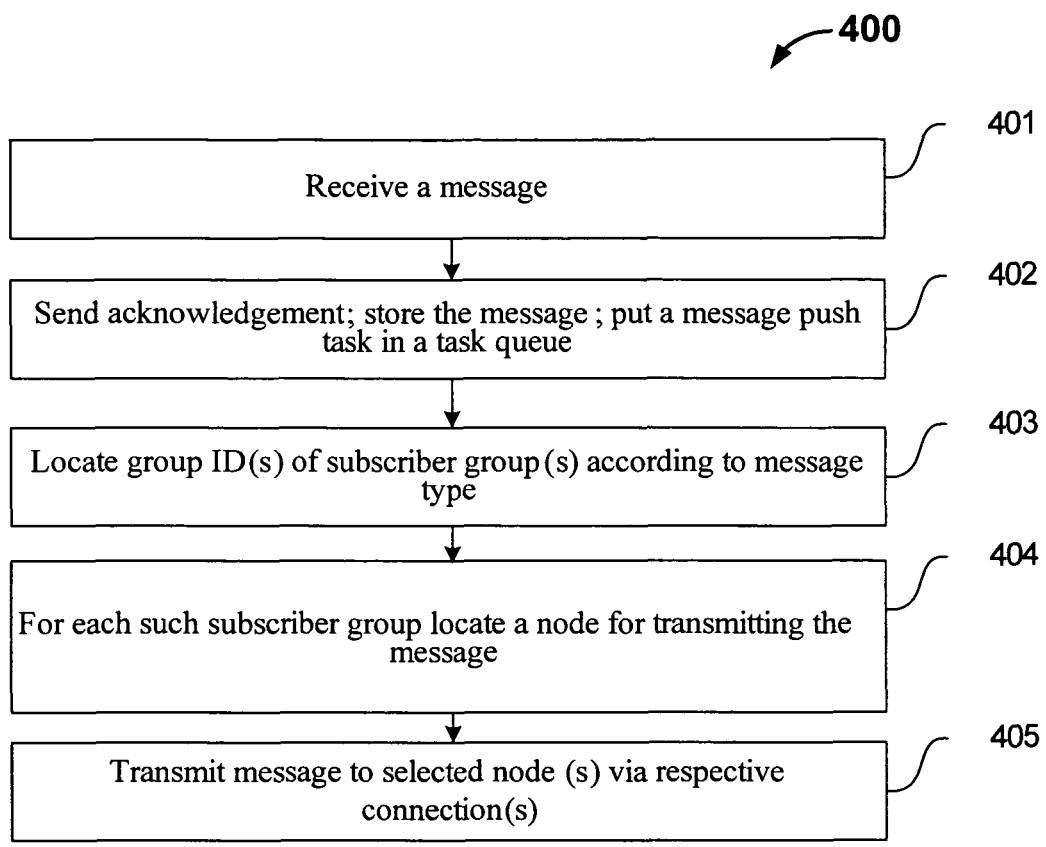
FIG. 4 is a flow chart illustrating an embodiment of a message processing procedure.

FIG. 4 is a flow chart illustrating an embodiment of a message processing procedure. Process 400 may be implemented on a middleware such as U12 of FIG. 1.

At 401, a message sent by a message distributor is received.

At 402, an acknowledgement is sent to the message distributor indicating that the distribution was successful. In some embodiments, the message is re-sent to the appropriate subscribers as soon as it is received. In some embodiments, a task queue is maintained to manage the order of messages to be processed. Thus, the message is stored and a message push task is put in a task queue.

At 403, the message push task is taken from the task queue, and the group ID(s) of one or more corresponding subscriber groups is located according to the message type. For example, in embodiments where subscription information is stored in a mapping table that maps message types to appropriate group IDs, the message type of the message received is used as an index into the table for looking up the corresponding subscriber group ID(s).

At 404, each of the corresponding subscriber groups found to be subscribing to the received message type is processed. In particular, a node with a connection to the middleware is located for each subscriber group subscribing to the message type. In embodiments where a list of active connections between the middleware and respective nodes in subscriber groups is maintained, connections of subscriber groups subscribing to the present message type are located. If only one connection is found, it is used directly. If multiple connections are found, a connection may be selected randomly from these connections. In some embodiments, rather than randomly choosing a node/connection, each node in the subscriber group with an active connection is polled to determine whether it is idle. The idle node is selected for message transmission.

At 405, the message is transmitted to the selected node(s) via respective connection(s).

Upon receipt of the message, the node processes the message and takes appropriate actions. For example, where a transaction success message is received by a log server and a seller notification server, the former updates log information and the latter sends out email notification to the seller.

In some embodiments, each node of the subscriber groups is connected to the server of the middleware in a long connection mode where the connection remains open once it is established. This way, when the server of the middleware receives a message, it may search for the connection(s) to the node(s) of the subscriber(s) which subscribes for the message among the current connections, and push the message to the node(s) via the searched connection(s).

In an embodiment, there may be one or more message distributors divided into one or more distributor groups. Each distributor group may include one or more nodes. Each distributor group selects one node to distribute a message to the middleware. In this way, the distribution of the message can not be interrupted even if a node in the distributor group fails. In addition, when the message traffic to be distributed is heavy, a plurality of nodes in the group may be used, so as to share the processing load of the distributor.

The message processing methods and systems are described above according to some embodiments of the invention. The above particular embodiments are described as examples to illustrate the principle of the invention, so as to enable a better understanding of the idea and solutions of the invention. In addition, it will be appreciated that a person of ordinary skill in the art can recognize many variations or modifications to the embodiments and applications of the invention without departing from the disclosure of the invention. In summary, the invention is not limited to the above description.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A message processing system comprising:

a processor configured to:

divide a plurality of message subscriber nodes into a plurality of subscriber groups based at least in part on respective processing functions of the plurality of message subscriber nodes, wherein each subscriber group of the plurality of subscriber groups comprises one or more message subscriber nodes, wherein at least some of the one or more message subscriber nodes in each of the plurality of subscriber groups are associated with being connected to the message processing system;

assign each of the plurality of subscriber groups a unique identifier;

receive a message that is distributed by a message distributor, the message having a message type;

based at least in part on the message type, locate among the plurality of subscriber groups a first located subscriber group and a second located subscriber group that subscribe to the message type, wherein each message subscriber node of the first located subscriber group is configured to perform a first processing function associated with the first located subscriber group and wherein each message subscriber node of the second located subscriber group is configured to perform a second processing function associated with the second located subscriber group, wherein the second processing function is different from the first processing function;

select a message subscriber node among a plurality of message subscriber nodes in the first located subscriber group and select a message subscriber node among a plurality of message subscriber nodes in the second located subscriber group; and transmit the message to the selected message subscriber node that belongs to the first located subscriber group and transmit the message to the selected message subscriber node that belongs to the second located subscriber group, wherein the selected message subscriber node and no other message subscriber nodes of the first located subscriber group is configured to process the message based at least in part on the first processing function associated with the first located subscriber group and wherein the selected message subscriber node that belongs to the second located subscriber group and no other message subscriber nodes of the second located subscriber group is configured to process the message based at least in part on the second processing function associated with the second located subscriber group; and a memory coupled to the processor, configured to provide the processor with instructions.

2. The system of claim 1, wherein the message subscriber node is randomly selected among the plurality of message subscriber nodes in the first located subscriber group.

3. The system of claim 1, wherein the message subscriber node is selected to correspond to an idle node in the plurality of message subscriber nodes in the first located subscriber group.

4. The system of claim 1, wherein the message processing system further comprises a communication interface configured to maintain one or more connections with one or more message subscriber nodes in the plurality of subscriber groups in a long connection mode.

5. The system of claim 4, wherein the communication interface is further configured to connect to a newly added node in one of the plurality of subscriber groups, the newly added node being associated with said one of the plurality of subscriber groups based on the unique identifier of said one of the plurality of subscriber groups.

6. The system of claim 1, wherein locating in the plurality of subscriber groups the first located subscriber group that subscribes to the message type includes searching in a database configured to store a corresponding relationship of the message type and a unique identifier of a subscriber group that subscribes to the message type.

7. The system of claim 1, wherein the message is associated with an electronic transaction.

8. The system of claim 7, wherein the processing function associated with the first located subscriber group is associated with one or more of the following: updating a record transaction log based at least in part on the electronic transaction and notifying a seller that a product has sold.

9. A method for processing a message, comprising:
dividing a plurality of message subscriber nodes into a plurality of subscriber groups based at least in part on respective processing functions of the plurality of message subscriber nodes, wherein each subscriber group of the plurality of subscriber groups comprises one or more message subscriber nodes, wherein at least some of the one or more message subscriber nodes in each of the plurality of subscriber groups are associated with being connected to a message processing system;
assigning each of the plurality of subscriber groups a unique identifier;
receiving at a message processing system the message that is distributed by a message distributor, the message having a message type;
based at least in part on the message type, locating among the plurality of subscriber groups a first located subscriber group and a second located subscriber group that subscribe to the message type, wherein each message subscriber node of the first located subscriber group is configured to perform a first processing function associated with the first located subscriber group and wherein each message subscriber node of the second located subscriber group is configured to perform a second processing function associated with the second located subscriber group, wherein the second processing function is different from the first processing function;
selecting a message subscriber node among a plurality of message subscriber nodes in the first located subscriber group and selecting a message subscriber node among a plurality of message subscriber nodes in the second located subscriber group; and
transmitting the message to the selected message subscriber node that belongs to the first located subscriber group and transmitting the message to the selected message subscriber node that belongs to the second located subscriber group, wherein the selected message subscriber node and no other message subscriber nodes of the first located subscriber group is configured to process the message based at least in part on the first processing function associated with the first located subscriber group and wherein the selected message subscriber node that belongs to the second located subscriber group and no other message subscriber nodes of the second located subscriber group is configured to process the message based at least in part on the second processing function associated with the second located subscriber group.

10. The method of claim 9, wherein the message subscriber node is randomly selected among the plurality of message subscriber nodes in the first located subscriber group.

11. The method of claim 9, wherein the message subscriber node is selected to correspond to an idle node in the plurality of message subscriber nodes in the first located subscriber group.

12. The method of claim 9, further comprising maintaining one or more connections with one or more message subscriber nodes in the plurality of subscriber groups in a long connection mode.

13. The method of claim 12, wherein further comprising connecting to a newly added node in one of the plurality of subscriber groups, the newly added node being associated with said one of the plurality of subscriber groups based on the unique identifier of said one of the plurality of subscriber groups.

14. The method of claim 9, wherein locating in the plurality of subscriber groups the first located subscriber group that subscribes to the message type includes searching in a database configured to store a corresponding relationship of the message type and a unique identifier of a subscriber group that subscribes to the message type.

15. A message processing system comprising:
a message distributor configured to distribute a message, the message having a message type; and
a middleware server configured to:
divide a plurality of message subscriber nodes into a plurality of subscriber groups based at least in part on respective processing functions of the plurality of message subscriber nodes, wherein each subscriber group of the plurality of subscriber groups comprises one or more message subscriber nodes, wherein at least some of the one or more message subscriber nodes in each of the plurality of subscriber groups are associated with being connected to the message processing system;

assign each of the plurality of subscriber groups a unique identifier;
receive the message;
based at least in part on the message type, locate among the plurality of subscriber groups a first located subscriber group and a second located subscriber group that subscribe to the message type, wherein each message subscriber node of the first located subscriber group is configured to perform a first processing function associated with the first located subscriber group and wherein each message subscriber node of the second located subscriber group is configured to perform a second processing function associated with the second located subscriber group, wherein the second processing function is different from the first processing function;
select a message subscriber node among a plurality of message subscriber nodes in the first located subscriber group and select a message subscriber node among a plurality of message subscriber nodes in the second located subscriber group; and
transmit the message to the selected message subscriber node that belongs to the first located subscriber group and transmit the message to the selected message subscriber node that belongs to the second located subscriber group, wherein the selected message subscriber node and no other message subscriber nodes of the first located subscriber group is configured to process the message based at least in part on the first processing function associated with the first located subscriber group and wherein the selected message subscriber node that belongs to the second located subscriber group and no other message subscriber nodes of the second located subscriber group is configured to process the message based at least in part on the second processing function associated with the second located subscriber group;
the selected message subscriber node that belongs to the first located subscriber group is configured to receive the message and apply the first processing function based on content of the message and the selected message subscriber node that belongs to the second located subscriber group is configured to receive the message and apply the second processing function based on content of the message.

* * * * *